April 25, 1950 L. S. SCHER 2,505,210

COMBINATION ACOUSTIC AND ELECTRICAL TELEPHONE PICKUP

Filed Dec. 15, 1948 2 Sheets-Sheet 1

INVENTOR.
LOUIS S. SCHER
BY
James and Franklin

April 25, 1950 L. S. SCHER 2,505,210

COMBINATION ACOUSTIC AND ELECTRICAL TELEPHONE PICKUP

Filed Dec. 15, 1948 2 Sheets-Sheet 2

INVENTOR.
LOUIS S. SCHER
BY
Jamesand Franklin

Patented Apr. 25, 1950

2,505,210

UNITED STATES PATENT OFFICE 2,505,210

COMBINATION ACOUSTIC AND ELECTRICAL TELEPHONE PICKUP

Louis S. Scher, New York, N. Y.

Application December 15, 1948, Serial No. 65,454

8 Claims. (Cl. 179—178)

The present invention relates to a pick-up adapted to be employed with a telephone receiver and in particular to a pick-up which operates on the magnetic principle. The invention also relates to such a pick-up which is easily convertible from an electrical or electromagnetic type to an acoustic type.

Many occasions arise when it is desired to convert a single telephone receiver into a multiple receiver. In business applications it is often necessary that more than one person listen to a telephone conversation and when only a single phone is available this is normally impossible. Thus, an executive may wish his stenographer to transcribe a particularly important conversation or a salesman might wish his stenographer to record the orders he receives over the telephone. If an individual listener is hard of hearing, or if he is receiving the telephone call in a particularly noisy place, it may be desirable or even necessary that both of his ears be covered and that both of his ears receive and hear the conversation.

In addition, if the auditor has a hearing aid of conventional type, he may wish to apply the receiver of the telephone to the ear which is not fitted with the hearing aid and at the same time to acoustically conduct the conversation to the microphone of his hearing aid so that it will be amplified thereby and heard by the other ear, thus not only aiding in his hearing but rendering the use of the mouthpiece more convenient, particularly when a French-style phone is involved, and making the use of the hearing aid less conspicuous.

At other times it may be convenient or necessary to convert the conversation into an electrical form. Thus, for example, one may wish to have the conversation amplified and reprojected through a loud speaker in a remote place so that a number of people might hear the conversation, or one may wish to record the conversation electrically in a dictating machine, for example, of the phonographic or telegraphonic type.

Many other situations will arise where the use of an auxiliary telephone receiver pick-up is desired, and the prime object of the present invention is to devise such a pick-up which is readily convertible for use in all such applications.

Another object of the present invention is to devise a pick-up so constructed as to be readily convertible so as to provide either an electrical transducing action or a direct acoustic path therethrough, the pick-up thus being usable so as to provide either an electrical or an acoustic output.

A still further object of the present invention is to devise such a pick-up which does not interfere with normal use of the telephone receiver.

Yet another object of the present invention is to devise a pick-up associable with a telephone receiver, the transducing portion of the pick-up being positionable in magnetic relationship with the vibratory element in the telephone receiver so that transducing is accomplished through magnetic induction. As a more specific object the magnetic portion of the transducing head is so designed as to project into the telephone receiver so as to improve the efficiency of the electromagnetic transducing action.

Yet another object of the present invention is to devise a transducing pick-up the transducing elements of which are removable from the pick-up body so as to convert the pick-up from a transducing type to one which provides a direct acoustic path. Thus, the same pick-up may be employed for producing either an electrical or an acoustic output, which output may be received at a remote point if desired.

A more specific object of the present invention is to devise a convertible pick-up which is inexpensively constructed of a plurality of simple inexpensive parts and which may be easily assembled into operative condition.

To the accomplishment of the foregoing objects and such other objects as may hereinafter appear, the present invention relates to the pick-up construction as defined in the appended claims and as described in this specification, taken together with the accompanying drawings, in which:

Figures 1, 2:
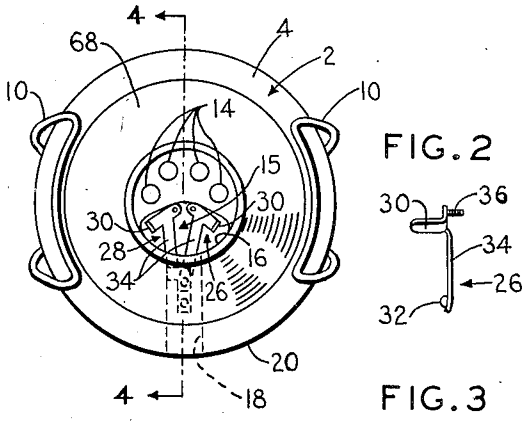
Fig. 1 is a front view of the pick-up of the present invention without the transducing elements.
Figs. 2 and 3 are perspective views of the electrical connective elements secured therein.
Figure 4:
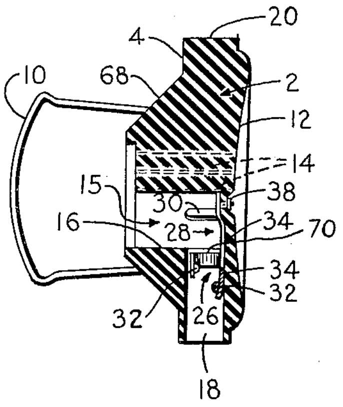
Fig. 4 is a side cross-sectional view thereof taken along the line 4—4 of Fig. 1.
Figure 3:
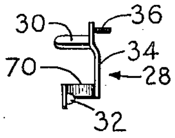
Figure 5:
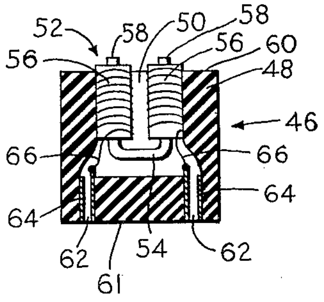
Fig. 5 is a side cross-sectional view of the transducing head.
Figure 8:
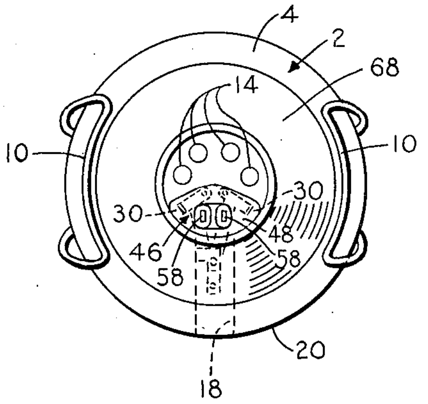
Fig. 8 is a view similar to Fig. 1 but showing the pick-up with the transducing head inserted therein.
Figures 6, 7, 9:
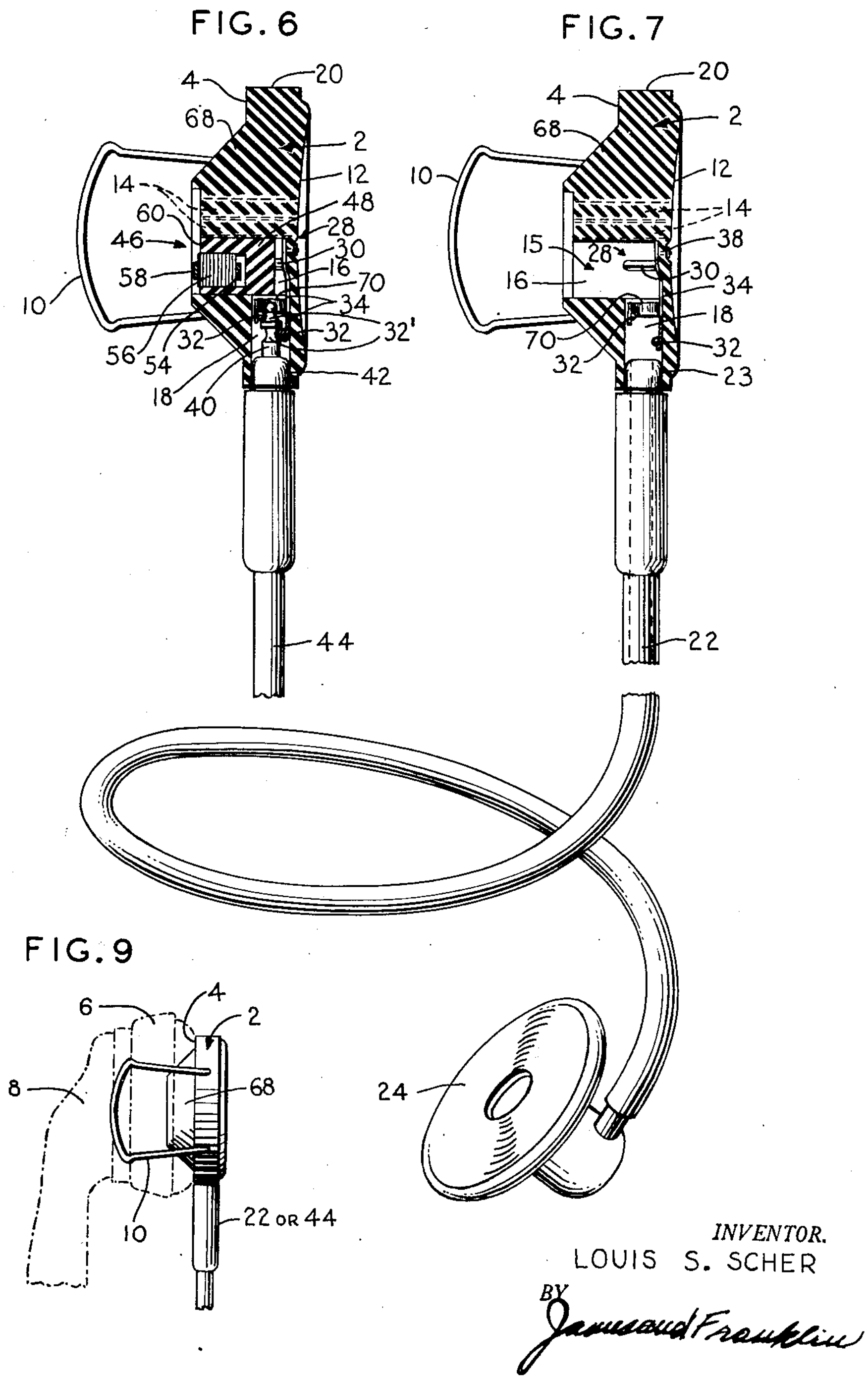
Fig. 6 is a view similar to Fig. 4 but showing the transducing head and the electrical lead in position in the pick-up, the pick-up thus being adapted to have an electrical output.
Fig. 7 is a view similar to Fig. 6 but showing the pick-up with the transducing head and electrical lead removed therefrom and with an acoustic conduit connected thereto, the pick-up thus being adapted to have an acoustic output.
Fig. 9 is a view showing the pick-up in position on the telephone receiver.

The pick-up itself comprises a body generally designated 2 having a front face 4 which is adapted to be placed against the ear piece 6 of a telephone receiver 8, resilient clips 10 being secured to the body 2 in any appropriate manner and adapted to resiliently engage the ear piece 6 of the telephone receiver 8 so as to retain the pick-up in position thereon for as long as may be desired.

The body 2 is preferably molded of a single piece of plastic material and the face opposite the face 4 is preferably provided with an inwardly dished portion 12 corresponding to the similar shape of a conventional telephone receiver and adapted to fit over the ear of the user of the device. One or more apertures 14 pass from the face 4 to the inwardly dished portion 12 so that when the pick-up body 2 is in position on the ear piece 6 of the telephone receiver 8 the sound produced at the sound transmitting portion of the ear piece 6 may pass through the body 2 and thus be heard by the user of the device. Thus, when the pick-up is attached to the telephone receiver, the receiver is useable in conventional manner.

The primary function of the pick-up is to provide an auxiliary or supplementary listening post. This is accomplished by incorporating into the body 2 a second aperture generally designated 15 and defined by the cavity 16 extending from the face 4 toward the dished portion 12 but not extending all the way through the body 2 and by the passage 18 which extends between one surface of the body 2 and the interior of the cavity 16. In the form here specifically disclosed, the passage 18 extends from the side 20 of the body 2 to the innermost portion of the cavity 16.

When it is desired that the auxiliary or supplementary hearing station be acoustic in nature, a hollow preferably flexible tube 22 defining an acoustic conduit and having a frictional bushing 23 at one end thereof is inserted into the passage 18, the other end of the tube 22 terminating in an ear piece 24, a direct acoustic path thus being defined between the sound transmitting ear piece 6 of the telephone receiver 8 and the auxiliary ear piece 24 via the cavity 16, the passage 18 and the hollow tube 22 removably inserted into the passage 18.

In order that the pick-up might be convertible to one having an electrical output, a pair of connective elements generally designated 26 and 28 are secured inside the second aperture 15. Each of these connective elements comprises an electrically conductive prong 30 adapted to project through the cavity 16 toward the front face 4 of the pick-up body 2, to each of which prongs 30 a contact portion 32 is electrically connected by means of connective portion 34. Each of the connective elements 26 and 28 are secured within the second aperture in such a manner that they are electrically separated throughout their length. As here disclosed, the securing is achieved by means of screw portions 36 which may be integrally formed with the connective elements 26 and 28 and which are passable through holes bored in the inner wall of the cavity 16 and are engageable with nuts 38 on the exterior of the body 2. It will be noted that the contact portions 32 are disposed within the passage 18 and are longitudinally spaced one with respect to the other so as to be engageable with the corresponding contact portions 32′ of a conventional plug-in jack 40 provided with a frictional bushing 42, to which jack 40 an electrical lead 44 is connected, the jack being insertable into the passage 18 in the same manner as was the hollow acoustic conduit 22.

The prongs 30 are adapted to receive and make electrical connection with the transducing head generally designated 46, this head comprising a body portion 48 of a shape generally corresponding to that of the cavity 16 and insertable thereinto from the face 4 of the pick-up body 2, the transducing head body 48 being provided with a centrally disposed aperture 50 into which the magnetic portion generally designated 52 is securable. The magnetic portion 52 may comprise a U-shaped magnetizable armature 54 around which coils 56 are wound, the projecting ends 58 of the parallel legs of the U preferably projecting out beyond the front face 60 of the transducing head 46 so as to be positionable into close magnetic relationship with the sound transmitting portion of the telephone ear piece 6.

The inner face 61 of the transducing head body 48 is provided with a pair of apertures 62 each preferably lined with an electrically conductive sheath 64, the latter being connected to the ends of the coils 56 by means of leads 66. The apertures 62 are so shaped and positioned as to fit over the prongs 30 when the transducing head 46 is inserted into the cavity 16, electrical connection between the coils 56 and the prongs 30 being accomplished via the conductive sheath 64 and the leads 66. The friction between the prongs 30 and the interior of the apertures 62, together with the friction between the exterior of the transducing head body 48 and the interior surfaces of the cavity 16, is sufficient to retain the transducing head 46 in position in the cavity 16 for as long as desired, the transducing head 46 being readily removable from the cavity 16 merely by pulling it out therefrom.

It will be noted that the central portion of the front face 4 of the pick-up body 2 is provided with a projecting portion 68 of frusto-conical shape, the cavity 16 being formed in this portion 68. The face 4 of the pick-up body 2 is adapted to rest on the periphery of the ear piece 6, secured thereon by means of the clips 10, while the portion 68 of the pick-up body 2 projects well into the ear piece 6. This has several desirable effects. In the first place, the acoustic paths from the sound transmitting elements of the ear piece 6 to the inwardly dished portion 12 of the pick-up body 2 and through the cavity 16 and the passage 18 to the hollow tube 22 are effectively insulated from any externaly disturbances. Of perhaps even greater significance is the fact that when the transducing head 46 is inserted into the cavity 16, its forward end is positioned extremely close to the sound transmitting portion of the ear piece 6, and in particular the projecting ends 58 of the magnetizable armature 54 which, as has already been stated, preferably project out beyond the forward surface 60 of the transducing head body 48, are positioned well into the ear piece 6 and hence are well within the fluctuating magnetic field always present in the ear piece when sound is being produced thereby. The fluctuations of this magnetic field correspond to the sound being produced, and the magnetic portion 52 of the transducing head 46, and in particular the magnetizable armature 54 thereof, causes said fluctuating magnetic field to induce corresponding currents in the coils 56.

When the pick-up unit of the present invention is arranged so as to have an electrical output, that is to say, when the transducing head 46 is inserted into the cavity 16 so that the prongs 30 of the connective elements 26 and 28 are received within the apertures 62 of the transducing head body 48, and when the jack 40 is inserted into the passage 18 so that the contact portions 32 of the connective elements 26 and 28 make electrical connections with the contact portions 32' of the jack 40, the currents induced in the coils 56 are transmitted via the leads 66, the conductive sheath 64, the prongs 30, the intermediate portions 34, and the contact portions 32 to the electrical lead 44 by means of which they may be conducted to any suitable apparatus such as an amplifier or a recording machine. It will be noted that at the same time that the electrical output from the pick-up of the present invention is being employed an acoustic path through the apertures 14 is also provided so that normal audition of the telephone conversation may take place.

When it is desired to have two acoustic outputs from a single telephone ear piece 6, the pick-up unit of the present invention may easily be converted to that end, thus eliminating the necessity for employing separate pick-up units when electrical and acoustic outputs are desired. To accomplish this conversion, it is necessary only to remove the transducing head 46 from the cavity 16 and the jack 40 from the passage 18, their removal being accomplished merely by pulling them out of the cavity and passage respectively, and by inserting the friction bushing 23 on the end of the hollow tube 22 into the passage 18. The connective elements 26 and 28 are of such a size that they do not completely block either the cavity 16 or the passage 18, thus leaving a direct acoustic path through the pick-up body 2 via the second aperture 15 supplementary or in addition to the acoustic path achieved via the apertures 14. The connective elements 26 and 28 are of as small a size as is consonant with their achieving the necessary electrical connections when the transducing head 46 and the jack 40 are inserted, and are preferably so shaped as to conform as much as possible to the side surfaces of the cavity 16 and passage 18, thus interfering as little as possible with the acoustic path. The connective element 26 in the specific form here disclosed lies exclusively along the bottom wall of the cavity 16 and the side of the passage 18. The connective element 28 extends along the bottom wall of the cavity 16 and then the portion 70 thereof is bent and curved so as to conform to the side surface of the passage 18, thus minimizing to the point of negligibility any interference or obstruction to the direct acoustic path through the second aperture defined by the cavity 16 and the passage 18.

The pick-up body 2 may be conveniently and inexpensively formed on a mass production basis by any conventional molding technique and the connective elements 26 and 28 may be secured to the pick-up body 2 merely by engaging the nuts 38 with the screws 36. The transducing head body 48 may be similarly molded. The sheaths 64 may be inserted into the apertures 62 in any conventional manner, the leads 66 from the coils 56 may then be electrically connected to the sheaths 64, and the magnetic transducing element 52 may be secured in the cavity 50 either by friction, adhesive or any other convenient manner.

It will therefore be apparent that the component parts of the pick-up of the present invention are all conveniently and inexpensively manufacturable and may be very readily assembled into their finished form. The pick-up produced thereby is readily convertible to provide either an acoustic or an electrical output from a telephone receiver without interfering with normal use of said receiver, thus eliminating the necessity of using separate pick-up units for the two purposes. In addition, when employed as a magnetic transducing head, the transducing elements of the pick-up are positioned well inside the ear piece 6 of the telephone receiver and thus in close magnetic relationship with the sound producing elements of the receiver, thus making for high fidelity and efficiency of reproduction.

While but a single embodiment of the present invention has been here disclosed, it will be apparent that many variations in specific design may be made therein, for example with respect to the type of transducing head 46 employed, the shape and appearance of the body 2, and the location and number of apertures 14 and 15, without departing from the spirit of the invention as defined in the following claims.

I claim:

1. A combination acoustic and electrical telephone pick-up comprising a body including a fastening element cooperable with a telephone receiver so that a first surface of said body is held adjacent the sound transmitting portion of said receiver, said body having a first aperture between said first surface and another surface through which sound may pass and having a second aperture between said first surface and another surface through which sound may pass, and electrical connective elements secured in said second aperture including first portions, releasably engageable with and electrically connectable to a transducing head positionable in the opening of said second aperture at said first surface and second portions releasably engageable with and electrically connectable to an electrical lead positionable in the opening of said second aperture at said other surface, said electrical connective elements only partially filling said second aperture so as to leave a direct acoustic path through said second aperture when said transducing head and said electrical lead are not in position, said pick-up thus being useable alternately to provide two acoustic paths or one acoustic path and one electrical path therethrough.

2. A combination acoustic and electrical telephone pick-up comprising a body including a fastening element cooperable with a telephone receiver so that one face of said body is held adjacent the sound transmitting portion of said receiver, said body having a first aperture between said face and the opposite face through which sound may pass, and having a second aperture between said face and a side of said body through which sound may pass, and electrical connective elements secured in said second aperture including first portions, releasably engageable with and electrically connectable to a transducing head insertable in said second aperture in the opening thereof at said face and second portions releasably engageable with and electrically connectable to an electrical lead insertable into said second aperture in the opening thereof at said side, said electrical connective elements only partially filling said second aperture so as to leave a direct acoustic path through said second aperture when said transducing head and said electrical lead are not in position, said pick-up thus being useable alternately to provide two acoustic paths or one acoustic path and one electrical path therethrough.

3. A combination acoustic and electrical telephone pick-up comprising a body including a fastening element cooperable with a telephone receiver so that one face of said body is held adjacent the sound transmitting portion of said receiver, said body having a first aperture between said face and the opposite face through which sound may pass and having a second aperture between said face and a side of said body through which sound may pass, said second aperture including a cavity extending from said face toward said opposite face and a passage from said side to the interior of said cavity, a pair of conductive but electrically separated prongs secured in said cavity and extending towards said face, said prongs being releasably engageable with and electrically connectable to a transducing head insertable in said cavity, and contact portions electrically connected to said prongs and extending into and secured within said passage, said contact portions being releasably engageable with and electrically connectable to an electrical lead insertable into said passage, said prongs and contact portions only partially filling said second aperture so as to leave a direct acoustic path through said second aperture when said transducing head and said electrical lead are not in position, said pick-up thus being useable alternately to provide two acoustic paths or one acoustic path and one electrical path therethrough.

4. In combination, the pick-up of claim 3 and a removable transducing head, said transducing head comprising a frame and a magnetic transducing element secured therein, said frame including contacts releasably engageable with said prongs and electrically connected to said magnetic transducing element.

5. In combination, the pick-up of claim 3 and a removable transducing head, said transducing head comprising a frame and a magnetic transducing element secured therein, said frame including socket portions into which said prongs are contactingly receivable when said transducing head is inserted into said cavity, and electrical connections between said socket portions and said magnetic transducing element.

6. A combination acoustic and electrical telephone pick-up comprising a body including a fastening element cooperable with a telephone receiver so that one face of said body is held adjacent the sound transmitting portion of said receiver, said body having a first aperture between said face and the opposite face through which sound may pass and having a second aperture between said face and a side of said body through which sound may pass, said second aperture including a cavity extending from said face toward said opposite face and a passage from said side to the interior of said cavity, a pair of conductive but electrically separated prongs secured in said cavity and extending towards said face, said prongs being releasably engageable with and electrically connectable to a transducing head insertable in said cavity, and contact portions electrically connected to said prongs and extending into and secured within said passage, said contact portions being releasably engageable with and electrically connectable to an electrical lead insertable into said passage, said prongs being secured to an inner surface of said cavity and said contact portions extending along inner surfaces of said cavity and passage so as to only partially fill said second aperture, thereby providing no interference with a direct acoustical path through said cavity and said passage when said transducing head and said electrical lead are not in position, said pick-up thus being useable alternately to provide two acoustic paths or one acoustic path and one electrical path therethrough.

7. A combination acoustic and electrical telephone pick-up comprising a body including a fastening element cooperable with a telephone receiver so that a first surface of said body is held adjacent the sound transmitting portion of said receiver, said body having an aperture between said first surface and another surface through which sound may pass, and electrical connective elements secured in said aperture including first portions, releasably engageable with and electrically connectable to a transducing head positionable in the opening of said second aperture at said first surface and second portions releasably engageable with and electrically connectable to an electrical lead positionable in the opening of said aperture at said other surface, said electrical connective elements only partially filling said second aperture so as to leave a direct acoustic path through said aperture when said transducing head and said electrical lead are not in position, said pick-up thus being useable alternately to provide an acoustic or an electrical path therethrough.

8. A combination acoustic and electrical telephone pick-up comprising a body including a fastening element cooperable with a telephone receiver so that a first surface of said body is held adjacent the sound transmitting portion of said receiver, said body having an aperture between said first surface and another surface through which sound may pass, and conductive elements secured within said aperture and releasably engageable with and electrically connectable to a transducing head and an electrical lead when said transducing head and said electrical lead are inserted into the openings of said aperture, said elements only partially filling said second aperture so as to leave a direct acoustic path through said aperture when said transducing head and said electrical lead are not in position, said pick-up thus being useable alternately to provide an acoustic and an electrical path therethrough.

LOUIS S. SCHER.

REFERENCES CITED

The following references are of record in the file of this patent:

UNITED STATES PATENTS

| Number | Name | Date |
|---|---|---|
| 431,810 | Hess | July 8, 1890 |
| 452,775 | Dickson | May 26, 1891 |
| 847,691 | Rector | Mar. 19, 1907 |
| 966,467 | Nichols | Aug. 9, 1910 |
| 1,204,136 | Creveling | Nov. 7, 1916 |
| 1,560,303 | Pape | Nov. 3, 1925 |
| 1,567,683 | Smith | Dec. 29, 1925 |
| 2,160,829 | Cherry | June 6, 1939 |
| 2,179,445 | Cooley | Nov. 7, 1939 |
| 2,204,529 | Cooley | June 11, 1940 |
| 2,268,665 | Loewe | Jan. 6, 1942 |

FOREIGN PATENTS

| Number | Country | Date |
|---|---|---|
| 279,126 | Great Britain | 1929 |